(12) United States Patent
Lee (10) Patent No.: US 7,834,874 B2
(45) Date of Patent: Nov. 16, 2010

(54) METHOD OF IMPROVING THE PRESENTATION OF IMAGE DATA WHICH INTER-LOCKED WITH VIDEO SIGNALS THROUGHPUT OF A TERMINAL AND A SYSTEM THEREOF

(75) Inventor: Jong Suk Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 11/452,636

(22) Filed: Jun. 14, 2006

(65) Prior Publication Data

US 2007/0002185 A1 Jan. 4, 2007

Related U.S. Application Data

(63) Continuation of application No. PCT/KR2004/003318, filed on Dec. 16, 2004.

(30) Foreign Application Priority Data

Dec. 16, 2003 (KR) .................. 10-2003-0092091

(51) Int. Cl.
 *G06T 17/00* (2006.01)
(52) U.S. Cl. ........................ 345/428; 710/15
(58) Field of Classification Search ................. 345/428; 348/731, 439.1
 See application file for complete search history.

(56) References Cited

U.S. PATENT DOCUMENTS

| 6,016,150 | A | * | 1/2000 | Lengyel et al. | ............ 345/426 |
| 6,072,498 | A | * | 6/2000 | Brittain et al. | ............ 345/428 |
| 6,313,838 | B1 | * | 11/2001 | Deering | ............ 345/420 |
| 6,538,651 | B1 | * | 3/2003 | Hayman et al. | ............ 345/419 |
| 7,002,564 | B1 | * | 2/2006 | Greenberg | ............ 345/204 |
| 2002/0054163 | A1 | * | 5/2002 | Yamada et al. | ............ 345/848 |
| 2003/0055904 | A1 | * | 3/2003 | Awaji | ............ 709/206 |

FOREIGN PATENT DOCUMENTS

| JP | H09-282249 | 10/1997 |
| JP | 2001-022948 | 1/2001 |
| JP | 2001-076180 | 3/2001 |
| JP | 2002-197016 | 7/2002 |
| JP | 2002-279449 | 9/2002 |
| JP | 2003-319365 | 7/2003 |
| JP | 2003-308277 | 10/2003 |
| KR | 10-0180160 | 11/1998 |
| WO | WO 98/53425 | 11/1998 |

* cited by examiner

*Primary Examiner*—Michelle K Lay
(74) *Attorney, Agent, or Firm*—H.C. Park & Associates, PLC (57) ABSTRACT

Systems and methods for presenting image data to a terminal are disclosed, the system including a memory configured to store tolerance cycle information associated with the realization time of an image data, a processor configured to determine a realization processing cycle of a first image data transmitted to the terminal, and a controller configured to control a realization processing cycle of a second image data transmitted to the terminal after the first image data, based at least in part on the outcome of comparing the realization processing cycle of the first image data with the tolerance cycle.

27 Claims, 5 Drawing Sheets

| Tolerance cycle (Cycle time) | Number of frames (FPS) |
|---|---|
| Over | Screen disconnection |
| 50 ms | 20 |
| 37.5 ms | 30 |
| 25 ms | 40 |
| Below | Realization at abnormal speed |

METHOD OF IMPROVING THE PRESENTATION OF IMAGE DATA WHICH INTER-LOCKED WITH VIDEO SIGNALS THROUGHPUT OF A TERMINAL AND A SYSTEM THEREOF

CROSS-REFERENCE TO RELATED APPLICATIONS

This application is a continuation of International Patent Application No. PCT/KR2004/003318, filed on Dec. 16, 2004, which claims priority to Korean Patent Application No. 10-2003-0092091, filed on Dec. 16, 2003, each of which is incorporated herein by reference.

BACKGROUND

1. Field of the Disclosure

The present disclosure relates to a method and system for adjusting the precision of image data. More particularly, the present disclosure relates to a method and system for adjusting the precision of image data by adjusting the rendering time per frame of image data.

2. Description of the Related Art

Together with increasing requests for more graphic and detailed realization of images, image data continually increases in quality and capacity. This in turn increases the demands placed on terminals used to process the image data, which often requires users to upgrade the terminals they currently use.

Consequently, the increase in demand on terminals increases cost by requiring terminals to be upgraded. Furthermore, it becomes increasingly more difficult to provide a normal image service in a terminal of low specification or hardware capability ("specification"). Namely, the conventional image providing service is affected by the specification of a terminal. Therefore, a minimum specification is often required from a terminal in order to prevent the disconnection of images displayed on the terminal or unnatural conversion of the terminal's screen.

In order to realize image data in a terminal of low specification, some image providing services compulsorily reduce the number of frames of image data realized on the terminal or reorganize image data based on the terminal's low specification.

An image providing service method which limits the number of frames of image data realized on the terminal reduces the frame rate of the delivered content. Therefore, a user might feel a decrease in the screen quality of the images themselves, and, in some circumstance, the user may find it impossible to identify the images. Accordingly, this method of service to a terminal of low specification often distracts the interest and concentration of the user viewing the terminal.

SUMMARY OF THE DISCLOSURE

Consequently, there is a need for the advent of a method and system for improving the presentation of image data which may adjust the rendering time per frame of image data according to specification of a terminal that displays the images, and that can provide an image service in a terminal of low specification without decreasing the quality of the images or the ability of the images to be identified. The present disclosure is conceived to solve the aforementioned problems.

One object of the present disclosure is to provide a method and system for improving the presentation of image data, which enables natural image realization through dynamic tuning by flexibly adjusting the rendering time per frame of image data according to an image signal throughput of a terminal receiving the image data.

Another object of the present disclosure is to provide a method and system which can maintain a high level of image identification by selectively performing level of detail ("LOD") adjustments of image factors based on rendering values, even for image data whose rendering time is realized per frame. In one embodiment, this is accomplished by dynamic tuning of image data based on the specification of the terminal.

Yet another object of the present disclosure is to provide a method and system which can provide a plurality of users with an image service that guarantees a predetermined quality of image data without regard to the specification of the terminal displaying the image data, by enabling the time for rendering the image on the terminal means to dynamically change based on the specification of the terminal.

In one embodiment, a method of presenting image data to a terminal is disclosed. The method comprises determining a realization processing cycle of first image data transmitted to the terminal. The method further comprises comparing the realization processing cycle of the first image data with a tolerance cycle of the terminal. The method further comprises adjusting the realization processing cycle of a second image data sent to the terminal after the first image data, based at least in part on the outcome of comparing the realization processing cycle of the first image data with the tolerance cycle.

In another embodiment, a computer-readable medium storing instructions that when executed perform a method is provided. The method comprises determining a realization processing cycle of first image data transmitted to the terminal. The method further comprises comparing the realization processing cycle of the first image data with a tolerance cycle of the terminal. The method further comprises adjusting the realization processing cycle of a second image data sent to the terminal after the first image data, based at least in part on the outcome of comparing the realization processing cycle of the first image data with the tolerance cycle.

In yet another embodiment, a system for presenting image data to a terminal is provided. The system comprises a memory configured to store tolerance cycle information associated with the realization time of an image data. The system further comprises a processor configured to determine a realization processing cycle of a first image data transmitted to the terminal. The system further comprises a controller configured to control a realization processing cycle of a second image data transmitted to the terminal after the first image data, based at least in part on the outcome of comparing the realization processing cycle of the first image data with the tolerance cycle.

In yet another embodiment, a system for presenting image data to a terminal is provided. The system comprises a means for storing tolerance cycle information associated with the realization time of the image data. The system further comprises a means for determining a realization processing cycle of first image data transmitted to a terminal. The system further comprises a means for controlling a realization processing cycle of second image data transmitted after the first image data if the realization processing cycle of the first image data is longer than the tolerance cycle.

DETAILED DESCRIPTION

A method and system for improving the presentation of image data is disclosed, which enables the presentation of image data to be controlled. In one embodiment, the image data is controlled based on the hardware capability, or specification, of the terminal which renders the image data.

According to one embodiment, dynamic tuning is a technique that increases the number of frames of image data that can be realized during a predetermined time. Dynamic tuning also controls the image data that is displayed on a terminal by adjusting the rendering time per frame of the image data according to the specification of the terminal so that the image data may be smoothly presented in the terminal. In other words, according to one embodiment, dynamic tuning is when a level of detail of an image factor constituting image data is decreased in order to reduce the rendering time of the image data because the prior rendering time spent in realizing one image exceeds a tolerance cycle, as will be discussed in further detail below According to one embodiment, a level of detail ("LOD") is a rendering level with respect to an image factor constituting image data. Thus, according to one embodiment, if a LOD of an image factor is high, then more polygons or textures may be included in the image factor in order to render a more detailed image realization than if the LOD of an image factor is low. For example, in a landscape image containing a tree as one image factor (among other image factors such as grass, hills, etc.), if the LOD value associated with the tree image factor is high, then the tree may be rendered with a high level of detail than if the LOD value associated with the tree image factor is low.

Figure 1:
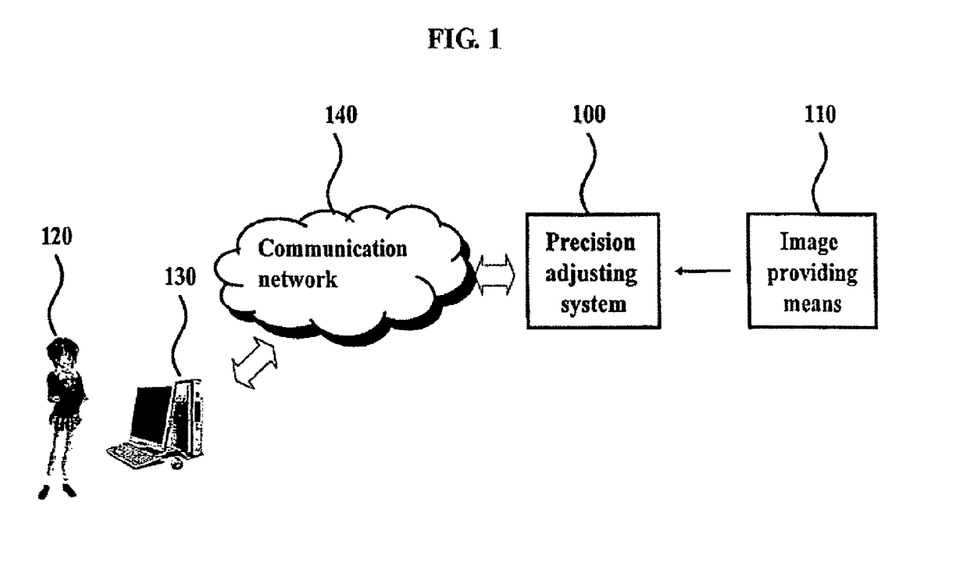
FIG. 1 illustrates general operations of a system for improving the presentation of image data according to one embodiment in the disclosure.

FIG. 1 illustrates general operations of a system for improving the presentation of image data according to one embodiment in the disclosure.

A precision adjusting system 100 according to the present disclosure receives image data from an image providing means 110, and appropriately adjusts the rendering time per frame of the received image data. Next, the precision adjusting system 100 controls the adjusted image data to be provided for a user 120's terminal 130. At this time, image data may mean continuous or discontinuous image information that provides the user with visual information such as a game picture or stop motion/moving picture. Image data is realized in a display of the terminal 130 by variety of rendering methods (e.g., a two-dimensional image, a three-dimensional image, etc). Terminals may include, but are not limited to, a television, a computer or computer monitor, graphics hardware, personal digital assistant, cellular telephone, or other electronic devices that may contain or be engaged with a display screen. In certain embodiments, terminals may be stand alone devices, and in other embodiments, terminals may be engaged to other systems, including, but not limited to, gaming systems, computing systems, broadcast systems, or servers.

According to one embodiment, the image providing means 110 first serves to provide predetermined image data for the user's terminal 130 in response to a request for transmission of image data received from the user 120. For example, the request may be sent to an online game server, a stop motion/moving picture providing server, a storage medium including a stop motion/moving picture, or other systems providing image data. Namely, the image providing means 110 provides image data for the user's 120 terminal means 130 based on predetermined algorithm signals. In embodiments where the image providing means 110 is a data storage medium, the user 120 may be provided with image data from storage media. In embodiments where the image providing means 110 is a network server, the user 120 may be directly provided with a predetermined game program from the network server (such as an online game server) via a communication network 140, or may be provided with image data by receiving an upgraded patch-file for a game program installed in the terminal 130. In addition, in embodiments where the image providing means 110 is storage media containing image data, an ODD (Optical Disc Drive) embedded in the terminal means 130 may directly load image data from the storage media and transmit the loaded image data to the terminal means 130.

In the following embodiments, as for example, it is explained that the image providing means 110 is a 3D online game server which supports progress of a game in real time with maintaining an online state. This is for embodying and conveniently describing the objects of the present disclosure. However, it will be apparent to those skilled in the art that the above matter does not limit spirits of technology.

The user 120 may mean an Internet user who is provided with an online game service that is embodied by image data. At this time, the image data is received from the image providing means 110 which is under predetermined contract, i.e. an online game server.

The terminal means 130 is a device which maintains a connection state with the precision adjusting system 100 through the communication network 140. The terminal means 130 serves to realize images on a predetermined display means (not illustrated) which is provided based on image signal processing with respect to input image data.

Namely, the terminal means 130 is a general concept for a terminal with a computing capacity to provide image data for a predetermined display means, by embedding a predetermined memory means and mounting a predetermined microprocessor, such as for example, a personal computer, a handheld computer, a PDA, a MP3 player, an electronic dictionary, a cellular phone, a smart phone and the like. In addition, the terminal means 130 generates information with respect to a realization processing cycle of input image data and transmits the generated information to the precision adjusting system 100 according to the present disclosure, whereby dynamic tuning is enabled that the precision adjusting system 100 determines the rendering time per frame of image data suitable for specification of the terminal means 130 (speed in processing image data) and decides a LOD adjustment rate of second image data after first image data.

The precision adjusting system 100 is positioned between the image providing means 110 and the terminal means 130, and determines the rendering time per frame of image data required for smoothly processing image data in the terminal means 130 and a LOD adjustment rate, by analyzing information with respect to a realization processing cycle. The realization processing cycle is collected by the terminal means 130. Namely, the terminal adjusting system 100 performs dynamic tuning with respect to image data input from the image providing means 110, and transmits the dynamic tuned image data to the terminal means 130.

Although FIG. 1 illustrates that the precision adjusting system 100 is connected to the terminal means 130 through the communication network 140, the precision adjusting system 100 according to the present disclosure may be located inside or outside the terminal means 130. Moreover, in case that the precision adjusting system 100 is located inside the terminal means 130, image data may be provided to the terminal means 130 in a form of firmware or other programs recording a precision adjusting method according to the present disclosure, and may be recorded in a storage means (not illustrated) of the terminal means 130.

Hereinafter, configuration of the precision adjusting system 100 of the present disclosure will be described with reference to FIG. 2.

Figure 2:
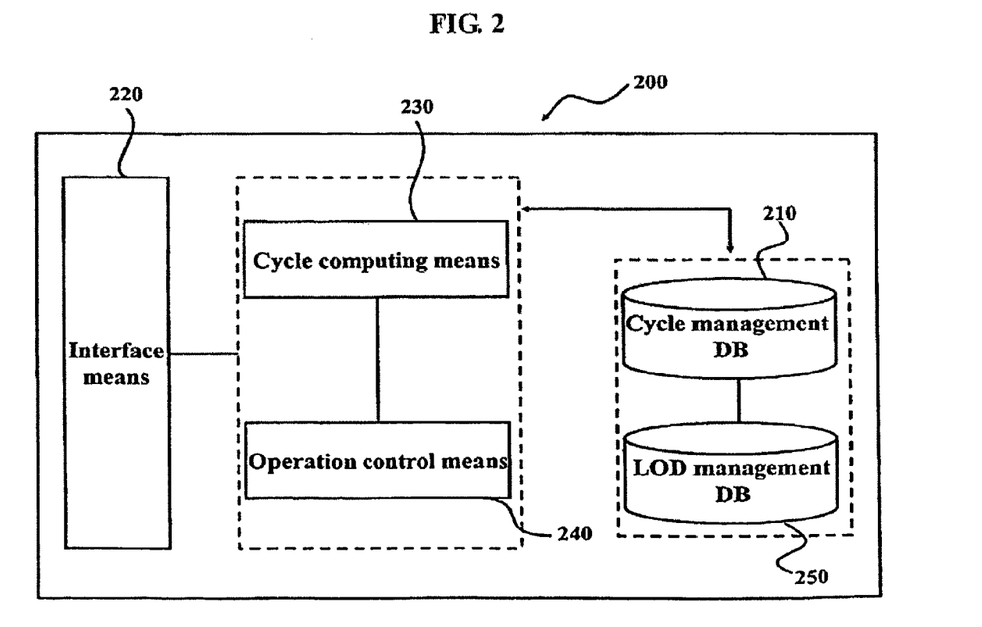
FIG. 2 illustrates one embodiment of a configuration of a system for improving the presentation of image data.

FIG. 2 illustrates one embodiment of a configuration of a system for improving the presentation of image data.

First, a precision adjusting system 200 of the present disclosure comprises a cycle management database 210, an interface means 220, a cycle computing means 230, an operation control means 240 and a LOD management database 250.

The cycle management database 210 is a device for storing tolerance cycle information associated with the realization time of image data. The tolerance cycle may be defined as the time spent in realizing one frame based on the number of frames realized per second in a terminal. Tolerance cycle information may be used to determine the limitations of a terminal with regards to disconnection of realized image data or determining when image data is not realized at a normal speed. The tolerance cycle may be affected by the number of image factors constituting image data, a LOD thereof, a visible range to be realized, and the like, in correspondence to the number of frames of image data that are realized per second.

Thus, the cycle management database 210 records and maintains information associated with the number of frames of image data realized on a display means during the predetermined time, and the standard time spent in realizing one frame. Hereinafter, information stored in the cycle management database will be in detail described with reference to FIG. 3.

Figure 3:
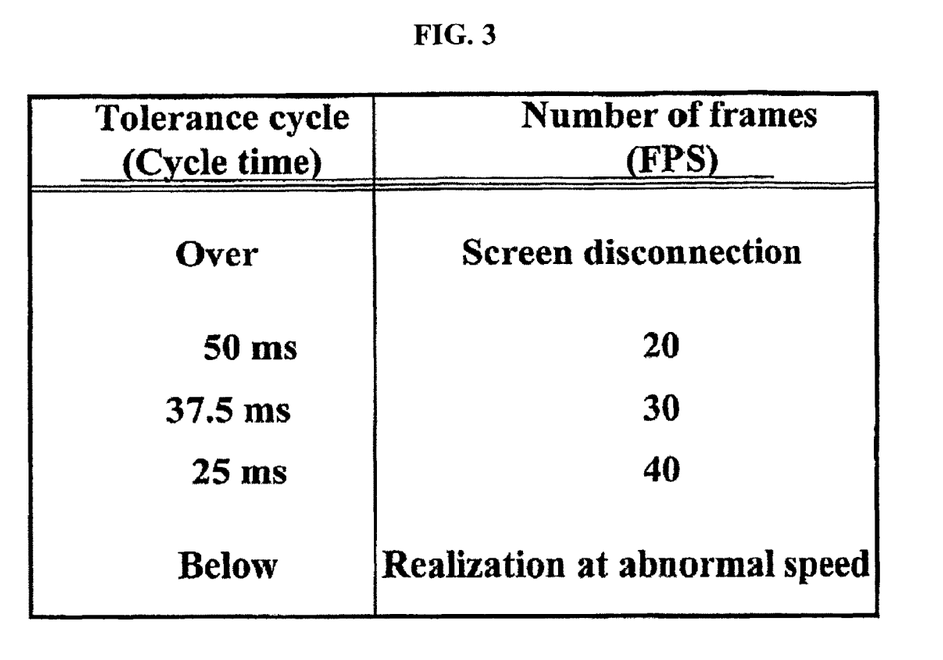
FIG. 3 illustrates one example of tolerance cycle information corresponding to the number of particular frames stored in a cycle management database according to one embodiment of the present disclosure.

FIG. 3 illustrates one example of tolerance cycle information corresponding to the number of particular frames stored in a cycle management database according to one embodiment of the present disclosure.

As illustrated in FIG. 3, the cycle management database 210 includes information on cycle time of a tolerance cycle and the number of frames of image data, preferably information on FPS (Frame Per Second) of image data to be realized per second.

Generally, in case that the numerical value of FPS is high, the number of images of image data realized per second increases. Thus, the rendering is delicately performed in a display means and consecutive screen conversions of images are performed smoothly. For example, the more the number of polygons or texture mapping used to yield a 3-D image in 3D dimensional image data is, the better precision or actuality of images becomes. However, for this, the number of frames of image data increases. In addition, since the number of frames of image data to be processed through a rendering operation increases, cycle time of a realization processing cycle gets longer.

Based on the relation between the number of frames and cycle time like above, the cycle management database 210 sets the number of frames to be realized per second.

And the cycle management database 210 sets and stores an image signal processing speed of the terminal means 130 to realize the frame flexibly, i.e. a limit standard of cycle time (tolerance cycle). Accordingly, the precision adjusting system 200 of the present disclosure analyzes information on a realization processing cycle of the terminal means 130. In addition, the precision adjusting system 200 determines image signal throughput with respect to image data maintained in the terminal means 130, by comparing the analyzed realization processing cycle with the tolerance cycle.

For example, it is assumed that the rendering time of the terminal means 130 is '25 ms', wherein the rendering time is time spent in realizing one image data. As illustrated in FIG. 3, FPS, the number of frames of image data realized per second is '40' (=1000/25). Therefore, the precision adjusting system 200 determines that the image signal throughput of the terminal means is allowable.

On the other hand, in case that the rendering time of the terminal 130 is '60 ms', the number of frames of realized image data exceeds an allowable value. Thus, screen disconnection may occur due to lack of the number of frames. Namely, in case that the rendering time of the terminal means 130 is '60 ms', arithmetically, the number of frames of image data realizable per second therein 130 is '16.67' (=1000/60), i.e. below '20', the minimum number of allowed frames per second according to the specification of the terminal. Consequently, this might cause abnormal realization of image data. Accordingly, the precision adjusting system 200 determines that the image signal throughput of the terminal means 130 is unallowable, and performs dynamic tuning so that the rendering time '60 ms' may be reduced to '50 ms', the maximum allowable value. Namely, dynamic tuning in the present embodiment may be defined as a signal processing in which in case that the rendering time spent in realizing one image data exceeds a tolerance cycle, the exceeded amount of the rendering time is compulsorily reduced. Reduction of the rendering time by dynamic tuning like above may be completed by decreasing a LOD of an image factor constituting image data. Therefore, any image data can be realized even in terminals of low specification. In certain embodiments, LOD adjustment of an image factor may include flat-rate reduction and adjustment of a LOD with respect to all the image factors constituting image data. In other embodiments, a LOD adjustment may include reduction of the rendering time of image data by selective LOD adjustment with respect to image factors comprising the image data, so that there is no significant effect on image identification or image data. For example, the number of polygons, colors, or depth used to render an image factor may be reduced.

The aforementioned embodiment describes an example of dynamic tuning (down tuning) which enables the number of frames of image data realizable per second (FPS) to go up by compulsorily reducing the rendering time. However, as for another embodiment of the present disclosure, it is also possible to easily induce dynamic tuning (up tuning) which enables FPS to go down by compulsorily increasing the rendering time. For example, FPS of the terminal means 130 whose rendering time is '25 ms', is '40' within an allowable value, and the rendering time is adjusted to get longer until the FPS becomes '20' (the lowest allowable value of FPS, refer to FIG. 3). That is, it is possible to get the time spent in realizing one frame, longer, by extending the rendering time of the terminal means 130 to '50 ms'. In addition, during the extended time ('25 ms'), it is possible to perform the rendering in a high LOD with respect to each of image factors. At this time, it is possible to express a screen background displayed on a user's screen in more detail. Accordingly it is possible to realize more delicate and precise image data by maintaining FPS according to the image signal throughput of the terminal means 130, within the allowable range, and at the same time, adjusting LOD with respect to each of image factors to increase.

The interface means 220 is a device for transmitting image data to the user 120, wherein the image data is dynamic tuned according to the image signal throughput of the terminal means 130. The interface means 220 may process a protocol change optimal for the communication network 140, so that there may be no data distortion, data transformation or data loss of image data during a process of transmitting image data to the terminal means 130. In addition, in transmitting image data to the terminal means 130 whose image signal throughput is determined to be excellent, the interface means 220 provides the terminal means 130 with image data received from the image providing means 110, without LOD adjustment with respect to an image factor.

Especially, the interface means 220 may receive information on a realization processing cycle of the terminal means 130 having received image data (first image data) and use the received realization processing cycle as information on dynamic tuning.

The cycle computing means 230 is a device for measuring a realization processing cycle of the terminal means 130 which is computed on the basis of image signal throughput of the terminal means 130 with respect to first image data.

Therefore, the cycle computing means 230 computes the predetermined rendering time spent in processing one frame. At this time, a realization processing cycle may mean time data spent in series of operations with respect to image signal processing, which are performed in the terminal means 130 until image data is input, loaded and rendered.

Namely, the cycle computing means 230 measures the time between a point of time (point S) when input of a control signal for converting image data on a predetermined display means is confirmed and a point of time (point F) when the rendering of the corresponding image data is completed on the predetermined display means, and receives the measured time as the realization processing cycle of the terminal means 230. At this time, the point S may mean a point of time when input of a control signal for converting image data on a display means, such as for example, user key input, or packet transmission from an online game server (other user's key input or the like) is performed. The point F may mean a point of time when the rendering operation with respect to the image conversion is completed.

In case that the input realization processing cycle of the terminal means 230 is longer than a tolerance cycle, the operation control means 240 determines that image signal throughput of the terminal means 130 is not in the optimal state for realizing current image data, and adjusts a LOD of image factors with respect to second image data to be reduced. Namely, the operation control means 240 recognizes image data which may not be appropriately realized within the predetermined time, through the image signal throughput of the terminal means 130, and enables the realization processing cycle of the terminal means 230 to be computed within a tolerance cycle by decreasing the LOD of the corresponding image data. For example, a texture mapping level may be reduced, the number of polygons used to render the image data may be reduced, the number of colors used to render the image data may be reduced, and so on.

For example, in case that the realization processing cycle of the terminal means 130 with respect to transmitted image data is '55 ms', the operation control means 240 recognizes that the input realization processing cycle is out of the range of the tolerance cycle which is stored in the cycle management database 210, and determines that the terminal means 130 does not appropriately adjust a LOD of a currently selected image factor, with image signal throughput thereof 130. Namely, FPS, the number of frames realized per second in the terminal means 130, goes below '20', the number of frames allowed by '18.18' (=1000/55) and there may be screen disconnection due to the lack of the appropriate number of frames. In certain embodiments, a screen disconnection occurs when the FPS rate is too high (often resulting in the terminal showing a black screen) or too low (often resulting in a noticeable delay between the rendering of image frames). Accordingly, the operation control means 240 adjusts a LOD of an image factor to be reduced, and performs a dynamic tuning so that the FPS may be preferably over '20', i.e. the realization processing cycle of the terminal means 130 may be below '50 ms'. As aforementioned, although LOD adjustment with respect to each of image factors should be differentiated based on a selected criterion, a predetermined rendering value should be considered to maintain an identification capacity with respect to image data. A predetermined LOD adjustment rate is applied to image data transmitted after performing dynamic tuning, based on image signal throughput of the terminal means 130. Thus, it is possible to process image data smoothly.

The present embodiment describes a method for realizing image data optimally on the terminal means 130 by taking an example of reducing the rendering time per frame of image data. However, this is only for convenient explanation. Therefore, it is apparent that there may be various methods. For example, there is a method securing realization of natural image data by selecting image data suitable for image signal throughput of the terminal means 130 and transmitting only selected image data.

Hereinafter, LOD adjustment, with respect to image factors by the operation control means 240 to reduce the rendering time will be described with reference to FIGS. 4a and 4b.

Figure 4A:
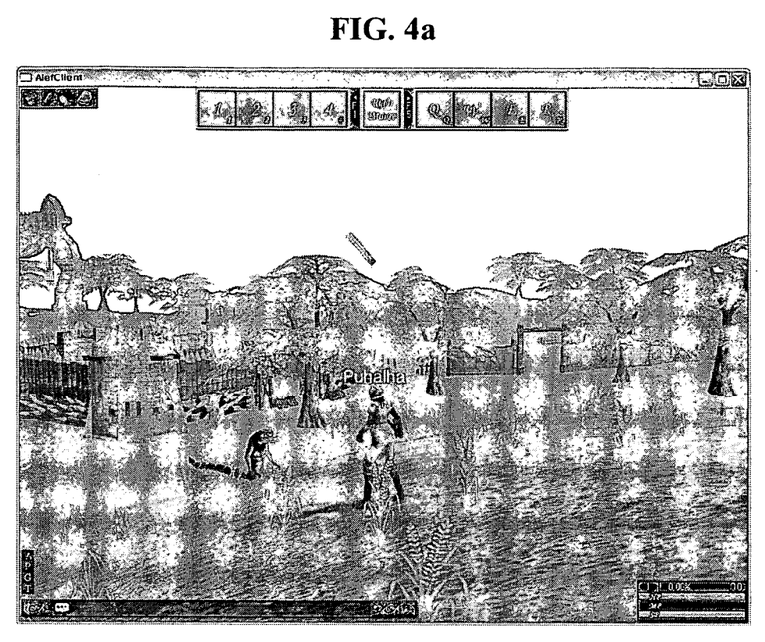
FIGS. 4a and 4b illustrate examples of adjusting a LOD of each image factor in order to reduce the rendering time per frame of image data according to one embodiment of the present disclosure.
Figure 4B:
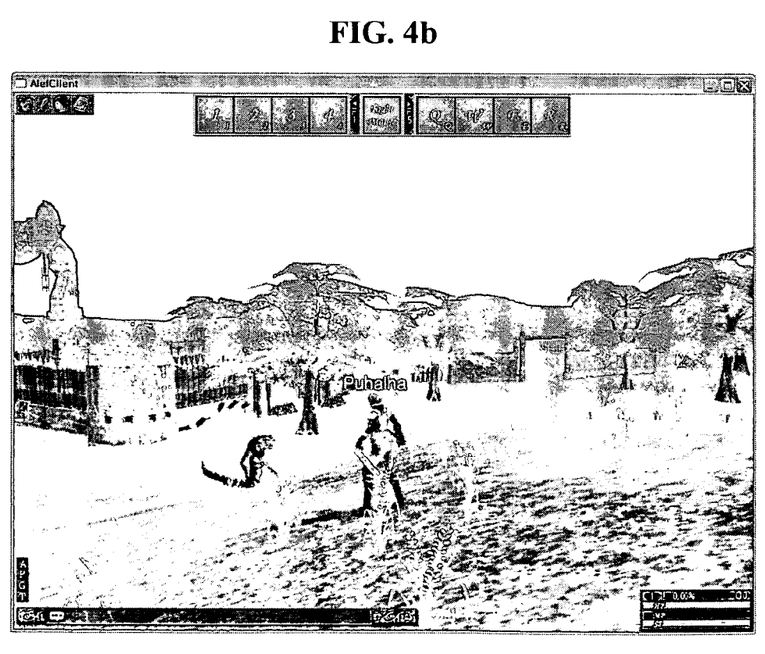

FIGS. 4a and 4b illustrate examples of adjusting a LOD of each image factor in order to reduce the rendering time per frame of image data according to one embodiment of the present disclosure.

FIG. 4a shows an image screen which is displaying image data in a state where dynamic tuning is unperformed, wherein the rendering is performed by applying a standard LOD (an ideal LOD enabling realization of the best image data) to all the image factors. In realizing image data in the best state like above, the terminal means 130 without appropriate image signal throughput may cause screen disconnection in realizing image data or spend too much time in realizing image data. Accordingly, in order to solve the problem in realizing images, the operation control means 240 gives a rendering value with respect to each of image factors and differently determines a LOD adjustment rate based on the rendering value. Namely, the operation control means 240 determines a LOD adjustment rate with respect to each of image factors in connection with a rendering value of image data, wherein the image factors constitute image data. In realizing images, the image factor may be the object of a rendering operation by the terminal means 130, such as for example, a screen background of image data, a character which is a dynamic or static subject located in a screen background, a static object, a user character, an object such as a NPC and the like, shadow of the object, an effect which may occur in image data, or the like. The image factors like above hold each of standard LOD information. The rendering operation of the terminal means 130 may cause level difference of details in realization of image data, wherein the rendering operation is based on the standard LOD.

Rendering values are respectively given to image factors, based on weight associated with identification of image data to be realized. Thus, in certain embodiments, rendering values represent weights associated with image factors within image data which determine the level of detail used to render the image factors. In certain embodiments, an image factor with a high rendering value may be rendered with a standard level of detail, whereas an image factor with a low rendering value may be rendered with a reduced level of detail. As illustrated in FIGS. 4*a* and 4*b*, in case that image data is related to a 3D online game, a comparatively high rendering value may be given to a character with which the user 120 plays, a rival character with which the user 120's character competes, items held by characters, a competing location, and the like. On the other hand, a comparatively low rendering value may be given to a long-distance screen background or a NPC, the number of trees in a screen background, or the like, which have no direct affect on the progress of a game.

Therefore, the operation control means 240, with respect to the terminal means 130 which has difficulties in smoothly realizing image data, provides image data enabling the rendering time of the terminal means 130 to be reduced by controlling a LOD of image factor whose rendering value is low, to be reduced, which is illustrated in FIG. 4*b*.

FIG. 4*b* shows realization of images in which the entire precision of a game screen is reduced and a LOD of each image factor is adjusted to be reduced by performing a rendering operation centering around a main character (e. g., identifier 'puhalha') who gives a direct effect on progress of the game. Namely, the LOD is decreased by deleting the predetermined number of trees, a long distance screen background having a low rendering value, or simplifying the external shape of a building. Thus, the number of polygons or textures for reduction of the rendering time is reduced. Accordingly, realization of image data is optimized by controlling screen disconnection and natural screen conversion without any problem in realizing image data to progress the game. In adjusting the LOD of the image factor like above, as an example for setting a level of LOD with respect to the number of polygons or the number of textures, as aforementioned, there may be a method of displaying the shape of character or object less delicately than the existing one by reducing the number of polygons or the number of textures which are used in realizing the shape of character or object. There may be a method of omitting rendering of a corresponding object, or the like. In certain embodiments, the LOD settings as applied to image factors may be adjusted. Therefore, it is possible to provide a service even in the terminal means 130 of low specification without difficulty, by flexibly adjusting the rendering time per frame of image data suitable for image signal throughput of the terminal means 130.

At this time, the terminal means 130 of low specification may not provide a service of image data due to decrease of speed in processing image signals.

As a method for providing optimal image data, the present embodiment, as for example, describes that the realization processing cycle of the terminal means 130 by the operation control means 240 is received and analyzed, and then dynamically tuned into the rendering time suitable for the image signal throughput of the terminal means 130. However, it is apparent that there may be variety of methods for providing image data of dynamic tuning, so that the rendering time per frame of image data may be adjusted by directly receiving information on specification of the terminal means 130 receiving image data from the user 120, and analyzing the received information.

As aforementioned, the LOD management database 250 is a device for storing a standard LOD with respect to each image factor constituting image data. Information on a standard LOD stored in the LOD management database 250 can be realized into the best image, in such a way that information is frequently received from a manufacturer of image data and updated by the inventor of the present disclosure.

The system 200 for improving the presentation of image data, having configuration like above, according to the present disclosure will be in detail described.

Figure 5:
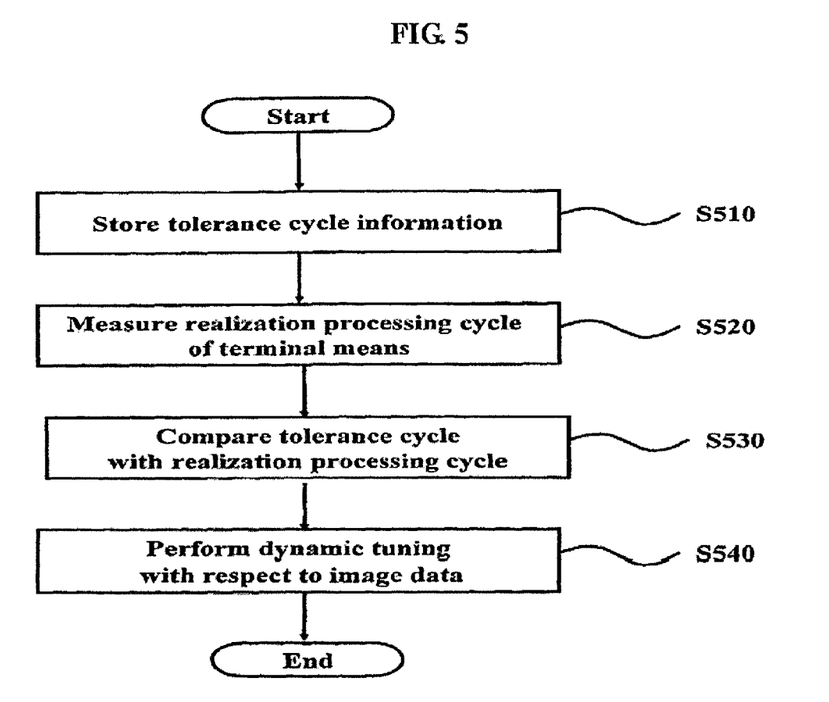
FIG. 5 is a flowchart for improving the presentation of image data according to one embodiment of the present disclosure.

FIG. 5 is a flowchart for improving the presentation of image data according to one embodiment of the present disclosure.

The method for improving the presentation of image data according to the present disclosure is performed by the aforementioned system 200.

First, the precision adjusting system 200 maintains the cycle management database 210 for storing tolerance cycle information associated with the realization time of image data (S510). This step S510 is a procedure for storing information on the rendering operation time which is ideal for maintaining the number of frames of image data, as a tolerance cycle, wherein the image data is to be realized during a certain period. Thus, the tolerance cycle may mean the limit time of operation in the terminal means 130 of the minimal specification, in which image data may be naturally realized on a predetermined display means. Accordingly, it becomes possible to determine image signal throughput of the terminal means 130 by determining whether the realization processing cycle of the terminal means 130, which is spent in processing image signals with respect to particular image data, is within the tolerance cycle. An explanation in relation thereto will be same to the aforementioned one (refer to FIG. 3).

In the next, the precision adjusting system 200 measures the realization processing cycle of the terminal means 130 with respect to first image data transmitted to the user 120's terminal means 130 (S520). This step S520 is a procedure for computing the spent operation time with respect to image signal processing in the terminal means 130 which realizes first image data, wherein the first image data is image data firstly transmitted during a predetermined cycle. This is for recognizing the spent operation time according to realization of image data of the terminal means 130, wherein the terminal means 130 sequentially performs input of image data, loading thereof, and rendering thereof. As aforementioned, as a level of LOD with respect to an image factor of image data to be realized goes up, the rendering time of the terminal means 130 for processing one frame into image signals increases. In addition, the increased width of the rendering time is affected largely by specification of the terminal means 130. For example, in case that specification of the terminal means 130 is low, the increased width of the rendering time becomes larger with a level of LOD rises.

Then, the precision adjusting system 200 compares the tolerance cycle stored in the cycle management database 210, with the measured realization processing cycle (S530). This step S530 is a procedure for determining image signal throughput of the terminal means 130 having receiving first image data. For example, the precision adjusting system 200 determines whether the realization processing cycle temporally passes a tolerance cycle by the operation control means 240.

At this time, in case that it is determined that the realization processing cycle is longer than the tolerance cycle, the precision adjusting system 200 controls the realization processing cycle of the terminal means 130 to be reduced by decreasing the rendering time per frame of second image data (S540). This step S540 is a procedure for performing dynamic tuning with respect to image data by adjusting a LOD with respect to each of image factors constituting image data. Thus, an image factor whose LOD should be preferentially adjusted is selected on the basis of a rendering value.

Moreover, this step S540 further comprises the step of reducing the rendering operation time of the terminal means 130 associated with the rendering of image data, according to reduction of LOD with respect to the selected image factor. Namely, there is an effect that the flexible realization of images is possible by maintaining the realization processing cycle of the terminal means 130 below the tolerance cycle, in such a way that the operation time associated with processing of image signals of the terminal means 130 is reduced according to the reduction of rendering per frame. Hereinafter, LOD adjustment with respect to an image factor will be in detail described with reference to FIG. 6.

Figure 6:
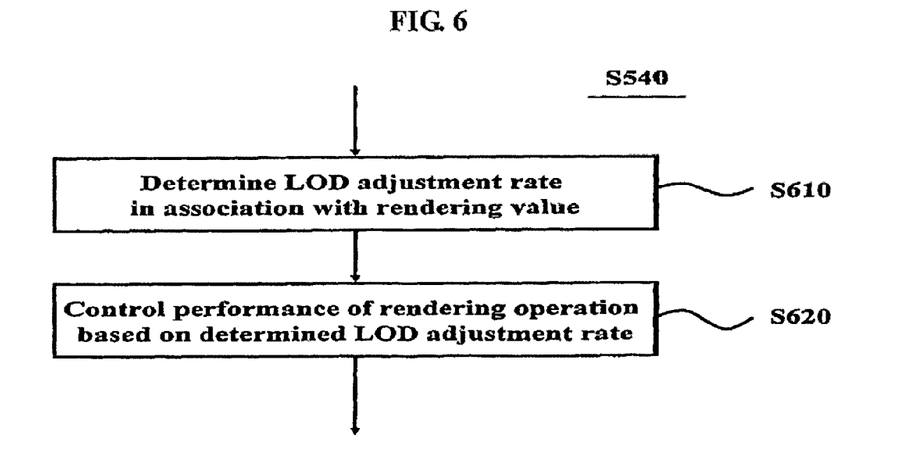
FIG. 6 illustrates one example of a LOD adjustment with respect to an image factor according to one embodiment of the present disclosure.

FIG. 6 illustrates one example of a LOD adjustment with respect to an image factor according to one embodiment of the present disclosure.

In dynamic tuning with respect to second image data, the precision adjusting system 200 determines a LOD adjustment rate with respect to an image factor, in connection with a rendering value of image data, as illustrated in FIG. 6 (S610). This step S610 is a procedure for connecting the LOD adjustment rate of a relevant image factor with the rendering value which is given to each of image factors according to predetermined weight. Thus, the LOD adjustment rate of an image factor whose rendering value is set high, preferably, may be determined in such a way that the standard LOD stored in the LOD management database 250 is maintained as it is. On the other hand, the LOD adjustment rate of an image factor whose rendering value is set low is adjusted to be lower than the standard LOD, thereby bringing an effect of reducing the rendering time with respect to image data. That is, in this step S610, the precision adjusting system 200 determines the LOD adjustment rate in such a way that, without deteriorating the identification capacity of image data, a LOD of an image factor which is not much important to configuration of substantial image data should be reduced. Hereinafter, a procedure of determining the LOD adjustment rate with respect to each of image factors will be described with reference to FIG. 7.

Figure 7:
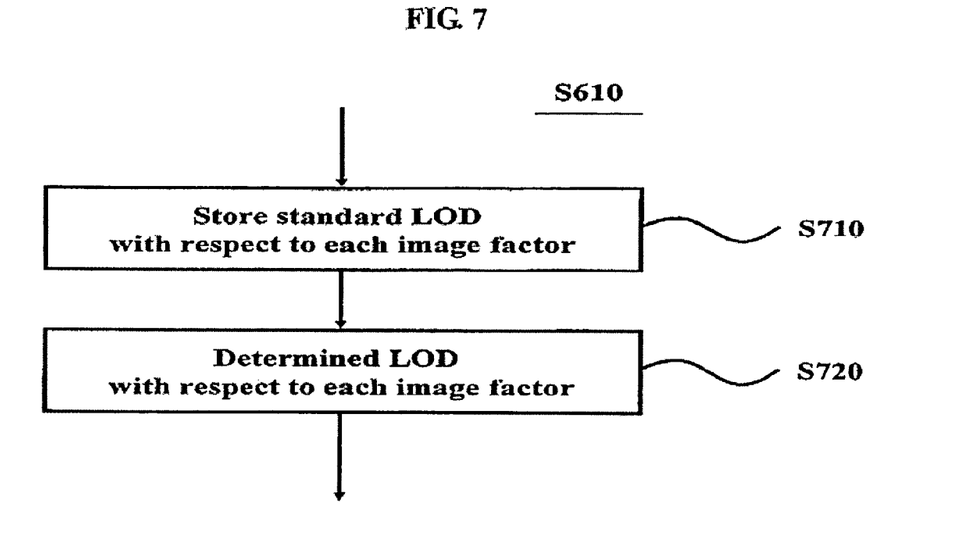
FIG. 7 illustrates one example of a method for determining a LOD adjustment rate of image factor according to one embodiment of the present disclosure.

FIG. 7 illustrates one example of a method for determining a LOD adjustment rate of image factor according to one embodiment of the present disclosure.

As aforementioned, the rendering value enables a comparatively high class to be given to an image factor which becomes an identification standard in recognizing image data. Accordingly, in the present embodiment, with respect to an image factor whose rendering value is comparatively low, the LOD adjustment rate is determined under assumption that although the rendering operation is omitted or performed lower than existing LOD, there is no big difference in identification of the entire image data.

First, the precision adjusting system 200 maintains the LOD management database 250 for storing standard LOD with respect to each of image factors of image data (S710). This step S710, in realizing image data, is a procedure for storing information on the optimal LOD at which a particular image factor is realized to be best.

At this time, it is possible to receive a standard LOD predetermined by a particular manufacturer of image data. The standard LOD like above may be defined as a LOD of each image factor for realization of ideal images. Therefore, since the optimal image realization is impossible in the terminal means 130 unequipped with a certain level of specification, screen disconnection occurs therein 130, the considerable rendering time is required and LOD adjustment by dynamic tuning is required.

In the next, the precision adjusting system 200 determines a LOD with respect to each of image factors based on the standard LOD or the rendering value (S720).

This step S720 is a procedure for selecting a level of LOD by image factors, according to the rendering value with respect to each image factor constituting image data. For example, with respect to an image factor whose rendering value is high, a level of LOD is determined so that a predetermined standard LOD may be maintained. With respect to an image factor whose rendering value is low, a LOD may be determined to be lower than the standard LOD. Therefore, the precision adjusting system 200 enables dynamic tuning with respect to image data, controlling the rendering time per frame to be optimized in specification of the terminal means 130, without deteriorating the identification capacity of image data.

Referring to FIG. 6 again, the precision adjusting system 200 controls the predetermined rendering operation with respect to image factors according to the rendering value, to be performed based on the determined LOD adjustment rate (S620).

This step S620 is a procedure for controlling the rendering operation of the terminal means 130 by the operation control means 240. Thus, image data is realized on a predetermined display means of the terminal means 130, based on the standard LOD or the LOD adjustment rate which is determined with respect to each image factor.

Accordingly, the identification capacity of image data may be maintained as it is, and additionally realization of image data may be proceeded smoothly by reducing the realization processing cycle of the terminal means 130. This is caused by reduction of the rendering time per frame.

Accordingly, although image data are same, a precision adjusting method of the present disclosure enables the rendering time of the terminal means 130 to be flexibly adjusted by image signal throughput of the terminal means 130 which realizes the image data. Therefore, there is an effect that it is possible to secure more users 120 who can be provided with an image data providing service, without regard to specification of the terminal means 130.

The embodiments of the present disclosure include computer readable media including program instructions to implement various operations embodied by a computer. The media may also include, alone or in combination with the program instructions, data files, data structures, tables, and the like. The media and program instructions may be those specially designed and constructed for the purposes of the present disclosure, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 8:
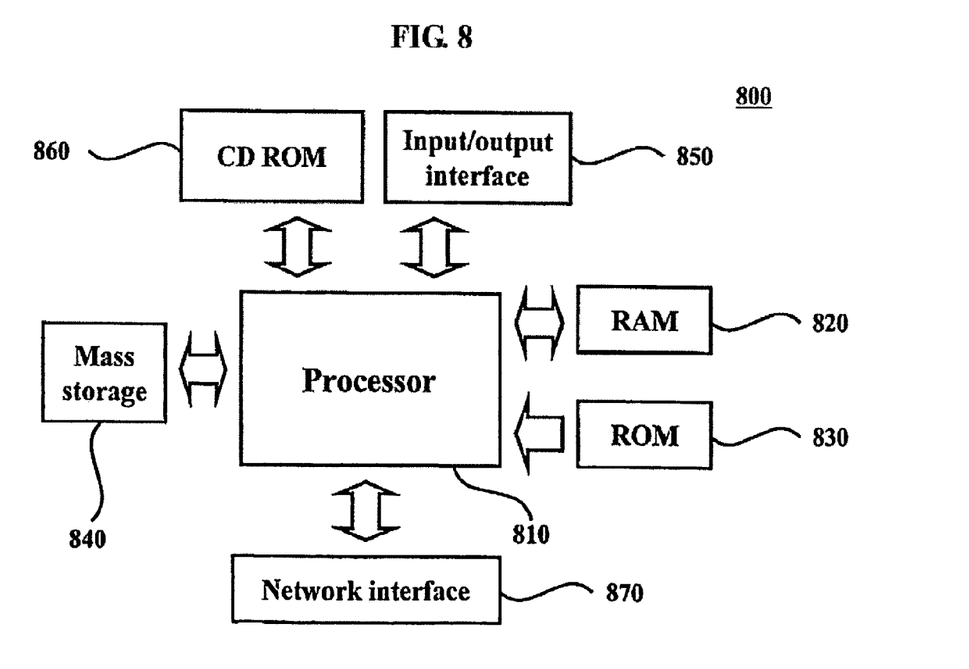
FIG. 8 illustrates a sample system that may be used to improve the presentation of image data according to one embodiment of the present disclosure.

FIG. 8 illustrates a sample system that may be used to improve the presentation of image data according to one embodiment of the present disclosure.

The computer system 800 includes any number of processors 810 (also referred to as central processing units, or CPUs) that are coupled to storage devices including primary storage (such as a random access memory, or "RAM" 820), primary storage (such as a read only memory, or "ROM" 830). As is well known in the art, ROM 830 acts to transfer data and instructions uni-directionally to the CPU and RAM 820 is used typically to transfer data and instructions in a bi-directional manner. Both of these primary storage devices may include any suitable type of the computer-readable media described above. A mass storage device 840 is also coupled bi-directionally to CPU and provides additional data storage capacity and may include any of the computer-readable media described above. The mass storage device 840 may be used to store programs, data and the like and is typically a secondary storage medium such as a hard disk that is slower than primary storage. A specific mass storage device such as a CD-ROM 860 may also pass data uni-directionally to the CPU. Processor 810 is also coupled to an interface 850 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 810 optionally may be coupled to a computer or telecommunications network using a network connection as shown generally at a network interface 870. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this disclosure.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching.

Therefore, it is intended that the scope of the disclosure be defined by the claims appended thereto and their equivalents.

Although the present disclosure has been described in connection with the embodiment of the present disclosure illustrated in the accompanying drawings, it is not limited thereto since it will be apparent to those skilled in the art that various substitutions, modifications and changes may be made thereto without departing from the scope and spirit of the disclosure.

INDUSTRIAL APPLICABILITY

As aforementioned, the present disclosure can provided a method and system for improving the presentation of image data, which enables natural image realization through dynamic tuning by flexibly adjusting the rendering time per frame of image data according to an image signal throughput of a terminal means receiving the image data.

Furthermore, the present disclosure can provide a method and system for improving the presentation of image data, which although image data is data which realizes the rendering time per frame, can maintain image identifying capacity to be high by selectively performing LOD adjustment of image factor based on a rendering value, in dynamic tuning of image data according to specification of the terminal means.

Furthermore, the present disclosure can provide a method and system for improving the presentation of image data, which can provide a plurality of users with an image service which guarantees a predetermined quality without regard to specification of a terminal means, by enabling the working time for rendering of the terminal means to dynamically change according to specification thereof.

What is claimed is:

1. A method of presenting image data from a server that is to be realized on a terminal, the method comprising:
    setting and storing tolerance cycle information associated with realization time of image data and an image processing speed of the terminal, each image data including a plurality of image factors, and each image factor having a rendering value;
    measuring, at a processor located outside of the server and the terminal and interposed between the server and the terminal, information indicating at least part of a time period to render first image data on the terminal;
    determining a realization processing cycle of first image data transmitted to the terminal based on the measured time period;
    comparing the realization processing cycle of the first image data with a tolerance cycle of the terminal; and
    adjusting, by the processor interposed between the server and the terminal, the realization processing cycle of a second image data sent to the terminal after the first image data, based at least in part on the outcome of comparing the realization processing cycle of the first image data with the tolerance cycle,
    wherein the adjusting of the realization processing cycle of the second image data comprises:
        determining a level of detail adjustment with respect to the second image data using the rendering values of the image factors of the second image data,
        wherein, when the realization processing cycle of the first image data is longer than the tolerance cycle, image factors having a relatively lower rendering value are adjusted before image factors having a relatively higher rendering value.

2. The method of claim 1, wherein the realization processing cycle is indicative of the time required between the time when data for rendering an image on the terminal is received and the time when the image is rendered on the terminal.

3. The method of claim 1, further comprising storing the tolerance cycle of the terminal in a cycle management database.

4. The method of claim 1, wherein adjusting the realization processing cycle of the second image data comprises maintaining or increasing the level of detail of the second image data if the realization processing cycle of the first image data is shorter than the tolerance cycle.

5. The method of claim 1, wherein adjusting the realization processing cycle of the second image data comprises reducing the level of detail of the second image data if the realization processing cycle of the first image data is longer than the tolerance cycle.

6. The method of claim 5, wherein adjusting the realization processing cycle comprises controlling the rendering time of the second image data.

7. The method of claim 5, further comprising applying the rendering values to the second image data based on weights in order to adjust the level of detail of the second image data.

8. The method of claim 7, wherein adjusting the level of detail of the second image data based on the rendering values further comprises:
   determining a standard level of detail of the second image data; and
   adjusting the level of detail of the second image data by applying the rendering values to the standard level of detail of the second image data.

9. The method of claim 8, wherein adjusting the standard level of detail of the second image data includes adjusting a screen background of the second image data, adjusting an object placed on a location of the screen background, and adjusting a shadow or effect of the object, wherein the object comprises a dynamic or static subject.

10. The method of claim 9, wherein adjusting the standard level of detail of the second image data further comprises adjusting the visible range of the screen background of the second image data, the visible range of the object being placed in a location of the screen background, and the visible range of the shadow or effect of the object.

11. The method of claim 1, wherein measuring at least part of the time period comprises measuring when input of a control signal for converting the first image data is confirmed.

12. The method of claim 1, wherein measuring at least part of the time period comprises measuring when rendering of the first image data has been completed on the terminal.

13. The method of claim 1, wherein measuring at least part of the time period comprises measuring when a user key input has been received.

14. A system for presenting image data to a terminal, the system comprising:
   a first interface configured to receive, from a server located outside of the system, image data to be realized on the terminal, each image data including a plurality of image factors, and each image factor having a rendering value;
   a second interface configured to provide, to the terminal located outside of the system, the images to be realized on the terminal based on a realization processing cycle;
   a memory configured to set and store tolerance cycle information associated with the realization time of an image data and an image processing speed of the terminal;
   a processor configured to measure at least part of a time period to render first image data on the terminal and to determine a realization processing cycle of the first image data transmitted to the terminal based on the measured time period; and
   a controller configured to control the realization processing cycle of a second image data transmitted to the terminal after the first image data, based at least in part on the outcome of comparing the realization processing cycle of the first image data with the tolerance cycle, and configured to control a level of detail adjustment with respect to the second image data according to the rendering values of the image factors of the second image data,
   wherein, when the realization processing cycle of the first image data is longer than the tolerance cycle, image factors having a relatively lower rendering value are adjusted before image factors having a relatively higher rendering value.

15. The system of claim 14, wherein the controller controls the realization processing cycle of the second image data in order to control the rendering time of the second image data.

16. The system of claim 14, wherein the memory is indicative of a cycle management database storing tolerance cycle information.

17. The system of claim 14, wherein the realization a processing cycle is indicative of the time between when data for rendering an image on a terminal is received and the when the image is rendered on the terminal.

18. The system of claim 14, wherein the level of detail adjustment of the second image data using the rendering values further comprises:
   a level of detail management database for determining a standard level of detail of the second image data; and
   a precision adjusting system for adjusting the level of detail of the second image data by applying the rendering values to the standard level of detail of the second image data.

19. The system of claim 14, wherein the level of detail adjustment includes adjusting a screen background of the second image data, adjusting an object placed on a location of the screen background, and adjusting a shadow or effect of the object, wherein the object comprises the dynamic or static subject.

20. The system of claim 14, wherein the processor is configured to measure at least part of the time period comprises measuring when input of a control signal for converting the first image data is confirmed.

21. The system of claim 14, wherein the processor is configured to measure at least part of the time period comprises measuring when rendering of the first image data has been completed on the terminal.

22. The system of claim 14, wherein the processor is configured to measure at least part of the time period comprises measuring when a user key input has been received.

23. A computer-readable non-transitory medium storing instructions when executed perform a method comprising:
   setting and storing tolerance cycle information associated with realization time of image data and an image processing speed of the terminal, each image data including a plurality of image factors, and each image factor having a rendering value;
   measuring, at a processor interposed between a server providing images that are to be realized on a terminal and located outside of the server and the terminal, at least part of a time period to render first image data on the terminal;
   determining a realization processing cycle of first image data transmitted to the terminal based on the measured time period;
   comparing the realization processing cycle of the first image data with a tolerance cycle of the terminal; and
   adjusting, at the processor interposed between the server and the terminal, the realization processing cycle of a second image data sent to the terminal after the first image data, based at least in part on the outcome of comparing the realization processing cycle of the first image data with the tolerance cycle, wherein the adjusting of the realization processing cycle of the second image data comprises:

determining a level of detail adjustment with respect to the second image data using the rendering values of the image factors of the second image data, wherein, when the realization processing cycle of the first image data is longer than the tolerance cycle, image factors having a relatively lower rendering value are adjusted before image factors having a relatively higher rendering value.

24. The storage medium of claim 23, further comprising instructions for measuring at least part of the time period comprises measuring when input of a control signal for converting the first image data is confirmed.

25. The storage medium of claim 23, further comprising instructions for measuring at least part of the time period comprises measuring when rendering of the first image data has been completed on the terminal.

26. The storage medium of claim 23, further comprising instructions for wherein measuring at least part of the time period comprises measuring when a user key input has been received.

27. A system for presenting image data from a server that is to be realized on a terminal located outside of the system, the system comprising:

means for receiving, from a server located outside of the system, image data to be realized on the terminal, each image data including a plurality of image factors, and each image factor having a rendering value;

means for providing, to the terminal located outside of the system, the images to be realized on the terminal based on a realization processing cycle;

means for setting and storing tolerance cycle information associated with the realization time of the image data and an image processing speed of the terminal;

means for measuring at least part of a time period to render first image data on the terminal;

means for determining the realization processing cycle of first image data transmitted to the terminal based on measured time period; and means for controlling a realization processing cycle of second image data transmitted after the first image data if the realization processing cycle of the first image data is longer than the tolerance cycle, and controlling a level of detail adjustment with respect to the second image data according to the rendering values of the image factors of the second image data, wherein, when the realization processing cycle of the first image data is longer than the tolerance cycle, image factors having a relatively lower rendering value are adjusted before image factors having a relatively higher rendering value.

* * * * *